US009070391B1

(12) United States Patent
Berscheit (10) Patent No.: US 9,070,391 B1
(45) Date of Patent: Jun. 30, 2015

(54) REDUCED-THICKNESS BASEPLATE (71) Applicant: Seagate Technology LLC, Cupertino, CA (US)

(72) Inventor: Gary J. Berscheit, Watertown, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/192,202

(22) Filed: Feb. 27, 2014

(51) Int. Cl.
G11B 5/48 (2006.01)
G11B 21/16 (2006.01)

(52) U.S. Cl.
CPC ............ *G11B 5/4813* (2013.01); *G11B 5/4833* (2013.01)

(58) Field of Classification Search
USPC ........................................... 360/244.2–244.9
See application file for complete search history.

(56) References Cited

U.S. PATENT DOCUMENTS

| 4,912,583 | A | * | 3/1990 | Hinlein ..................... 360/244.5 |
| 5,602,698 | A | * | 2/1997 | Miyazaki et al. ........... 360/244.6 |
| 5,808,835 | A | * | 9/1998 | Fujiwara ................... 360/244.7 |
| 6,046,885 | A | | 4/2000 | Aimonetti et al. |
| 6,215,624 | B1 | * | 4/2001 | Summers et al. .......... 360/244.5 |
| 6,399,179 | B1 | | 6/2002 | Hanrahan et al. |
| 6,560,072 | B2 | | 5/2003 | Takagi et al. |
| 6,597,538 | B1 | * | 7/2003 | Kashima et al. ........... 360/244.5 |
| 6,697,224 | B2 | | 2/2004 | Wang et al. |
| 6,956,720 | B2 | * | 10/2005 | Takagi et al. .............. 360/244.6 |
| 7,633,717 | B1 | | 12/2009 | Fossum et al. |
| 8,094,415 | B2 | * | 1/2012 | Yokota et al. ................ 360/290 |
| 2009/0262463 | A1 | * | 10/2009 | Yokota et al. ................ 360/290 |
| 2012/0275064 | A1 | * | 11/2012 | Yabu et al. ................. 360/244.5 |
| 2013/0301164 | A1 | * | 11/2013 | Nishida et al. ............. 360/244.7 |

* cited by examiner

*Primary Examiner* — Adam B Dravininkas
(74) *Attorney, Agent, or Firm* — Leanne Taveggia Farrell; Westman, Champlin & Koehler, P.A.

(57) ABSTRACT

A baseplate for attaching at least two elements includes a flange having at least one first portion with a first uniform thickness and having at least one second portion with a second uniform thickness. The second uniform thickness is less than the first uniform thickness. The baseplate further includes a boss tower that protrudes from and is contiguous with the flange. The boss tower protrudes from the at least one second portion of the flange.

19 Claims, 8 Drawing Sheets

REDUCED-THICKNESS BASEPLATE

SUMMARY

A component for attaching at least two elements includes a flange having at least one first portion with a first uniform thickness and having at least one second portion with a second uniform thickness. The second uniform thickness is less than the first uniform thickness. The component for attaching at least two elements further includes a boss tower that protrudes from and is contiguous with the flange. The boss tower protrudes from the at least one second portion of the flange.

A baseplate for coupling a suspension assembly to an actuator in a data storage device includes a flange having a proximal region that extends from a proximal end of the flange to a step and a distal region that extends from a distal end of the flange to the step and a boss tower that protrudes from and is contiguous with the flange. The boss tower is located in the proximal region of the flange. The distal region of the flange includes a first uniform thickness that is greater than a second uniform thickness of the proximal region of the flange.

A method of attaching at least two elements includes reducing a thickness of at least one portion of a flange of a component so that the flange includes at least one first portion having a first uniform thickness and at least one second portion having a second uniform thickness The second uniform thickness is less than the first uniform thickness. The method also includes coupling the component to a first element by inserting a boss tower that protrudes from the second portion of the flange into an aperture in a first element. The boss tower is then swaged to the first element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described below apply to a baseplate having a boss tower for swaging a first component to a second component in an electro-mechanical system. For example and as illustrated, a head gimbal assembly (HGA) having a load arm and baseplate is swaged to an actuator arm to form a head stack assembly (HSA) in a data storage device. A boss tower on the baseplate is inserted into an aperture in the actuator arm and a swage element is inserted into a swage hole of the boss tower to swage couple the boss tower of the baseplate to the aperture. During this forging-type process, the swage element, which has a larger diameter than an inner diameter of the boss tower, applies a compressive force to an inner surface of the boss tower such that the boss tower expands to hold the actuator arm to the load arm of the HGA.

When multiple discs are stacked on top of each other to increase data storage size, the overall z-height of the HSA is not small enough so as to maximize clearance between discs. Having maximum clearance prevents the HSA from damaging the discs during shock events. In addition, the stamping process used to produce the baseplate results in an overall shape of the flange of the baseplate that has variation.

Embodiments of the baseplate of the HSA, as described herein, include a flange and a boss tower that protrudes from the flange. A portion or portions of the flange have a thickness that is reduced. For example, in one embodiment, the flange of the baseplate includes at least two different uniform thicknesses. In another embodiment, the flange of the baseplate includes three different uniform thicknesses. A reduction in height or thickness to a portion or portions of the flange of the baseplate results in a reduction of the overall z-height of the HSA and increases the HSA-to-disc clearance when the portion of the baseplate that is reduced is the portion or portions that contact the actuator arm. In alternative embodiments, a reduction in height of portions of the flange of the baseplate leaves baseplate with a raised contact plane for contacting with the actuator arm. A contact plane that is raised above other portions of the baseplate provides an actuator arm, to which it contacts, that is less susceptible to the change in shape of the flange of the baseplate due to the stamping process from which it was made and thereby reduces resonance variation.

Figure 1:
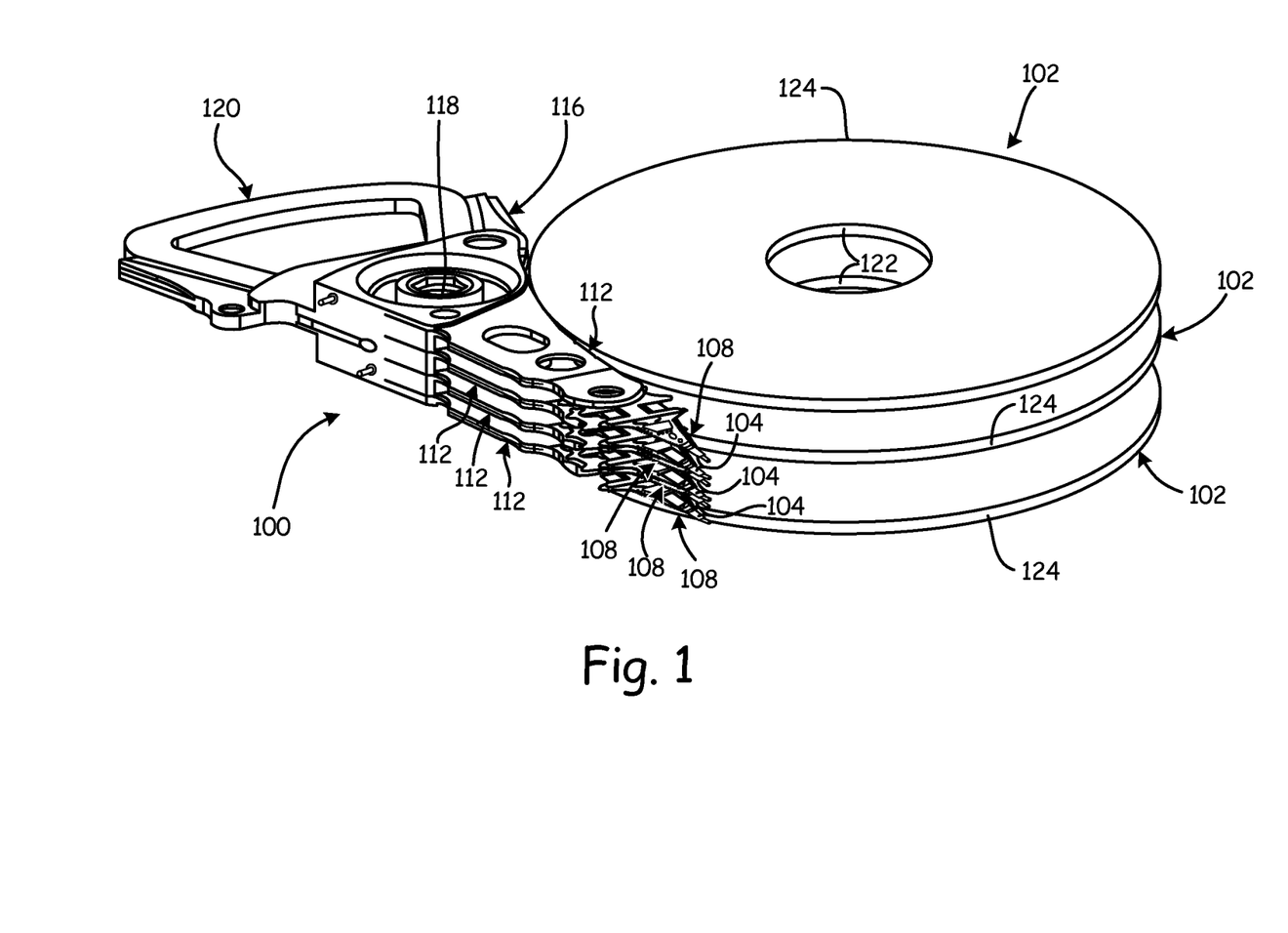
FIG. 1 is a perspective view of exemplary components of a data storage device including a head stack assembly and a medium.

FIG. 1 illustrates a perspective view of exemplary components of a data storage device including a head stack assembly (HSA) 100 and media 102. In one embodiment, media 102 stores information in a plurality of circular, concentric data tracks on data discs and are mountable to a spindle motor assembly that can rotate media 102 and cause its data surfaces to pass under respective bearing slider surfaces. As illustrated, each surface of media 102 has an associated header or slider 104, which carries transducers that communicate with surfaces of media 102.

Sliders 104 are each supported by a head gimbal assembly (HGA) 108, which are in turn attached to actuator arms 112 of an actuator mechanism 116 to form a head stack assembly (HSA) 100. Actuator mechanism 116 is rotated about a shaft 118 by a voice coil motor 120, which is controlled by servo control circuitry. Voice coil motor 120 rotates actuator mechanism 116 to position sliders 104 relative to desired data tracks between inner diameters 122 and outer diameters 124 of media 102.

Figure 2:
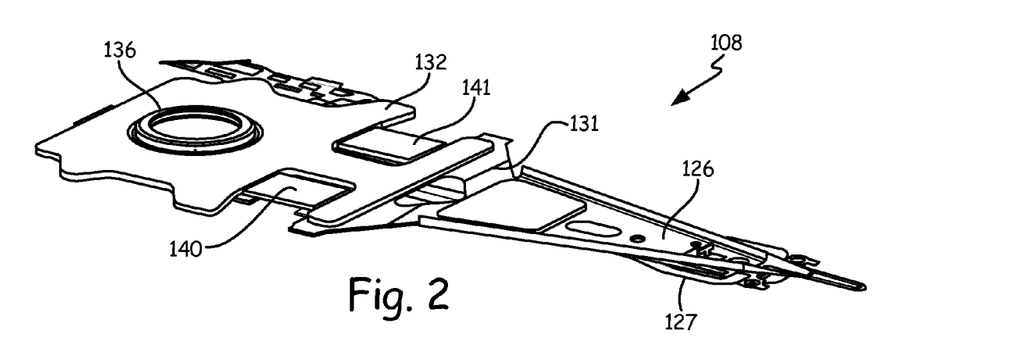
FIG. 2 is a perspective view of one of the exemplary head gimbal assemblies in FIG. 1, which embodiments of the disclosure are useful.
Figure 3:
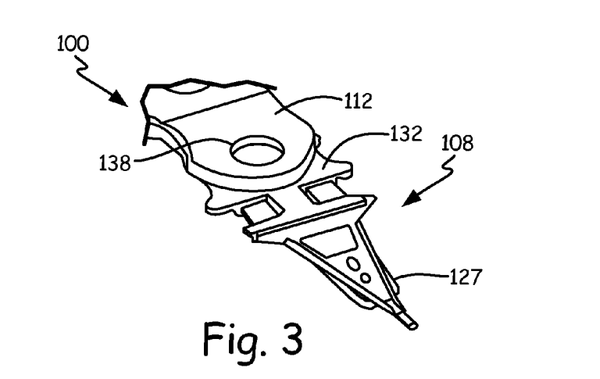
FIG. 3 is a partial perspective view of the head stack assembly illustrated in FIG. 1 including the head gimbal assembly illustrated in FIG. 2.

FIG. 2 illustrates an enlarged perspective view of exemplary HGA 108, which embodiments of the disclosure are useful. FIG. 3 is a partial perspective view of HSA 100 illustrated in FIG. 1 including HGA 108 illustrated in FIG. 2. HGA 108 includes a load beam or suspension 126, a gimbal or flexure 127, a hinge 131 and a mount or base plate 132. Load beam 126 supports a head or slider 104 (not shown in FIGS. 2-3) carrying transducers via gimbal or flexure 127. For example, a gimbal is typically integrated into load beam 126, while a flexure is a separate component with its own integrated gimbal feature that can be laser welded to load beam 126 and be pivotable about a dimple. Regardless of type, gimbal or flexure 127 is the feature to which head or slider 104 is attached.

Hinge 131 provides load beam 126 with a preload force. The preload force forces head or slider 104 towards the surface of a medium. In some embodiments, hinge 131 is a separate component from load beam 126 and is connected to load beam 126 by laser welding. In other embodiments, hinge 131 is integrated with and contiguous with load beam 126 as a single part. Mount plate or baseplate 132 provides an attachment structure for coupling actuator arm 112 to HGA 108. In one embodiment, baseplate 132 is laser welded to load beam 126. As illustrated in FIG. 2, the attachment structure is a boss tower 136 that is configured to insert into aperture 138 (FIG. 4) in actuator arm 112 and undergo a swaging process, such as ball swaging, to couple actuator arm 112 to HGA 108. Boss tower 136 is integrally formed with baseplate 132 and is made of the same material. For example, baseplate 132 can be made of a ferrite, such as stainless steel, aluminum, engineered plastic and the like.

HGA 108 also includes a pair of microactuators 140 and 141. While voice coil motor 120 rotates actuator mechanism 116 to position sliders 104 relative to desired data tracks between inner diameters 122 and outer diameters 124 of media 102 (see FIG. 1), microactuators 140 and 141 provide HGA 108 with fine or precision-type positioning of sliders 104 relative to desired data tracks between inner diameters 122 and outer diameters 124. In one embodiment, microactuators 140 and 141 are piezoelectric actuators. Piezoelectric actuators convert an electric signal into controlled physical displacements and, as such, piezoelectric actuators are made of fragile materials. Exemplary materials include ceramics and metal electrode foils. As illustrated in FIG. 2, microactuators 140 and 141 are located within inlets in baseplate 132 and have heights that are substantially the same or less than the height of baseplate 132. In this way, the rigid material of baseplate 132 provides protection to the fragile material of microactuators 140 and 141.

Figure 4:
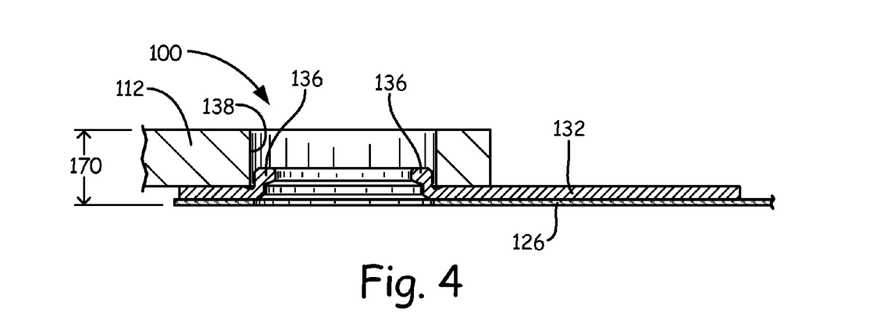
FIG. 4 is an enlarged section view representative of a portion of the head stack assembly illustrated in FIG. 1.

FIG. 4 is an enlarged section view representative of a portion of HSA 100. More specifically, FIG. 4 illustrates a section view of a portion of actuator arm 112, baseplate 132 and a portion of load beam 126 before boss tower 136 is swaged to aperture 138. As illustrated in FIG. 4, the z-height 170 of HSA 100 includes an overall height or thickness of actuator arm 112, baseplate 132 and load beam 126.

Figure 5:
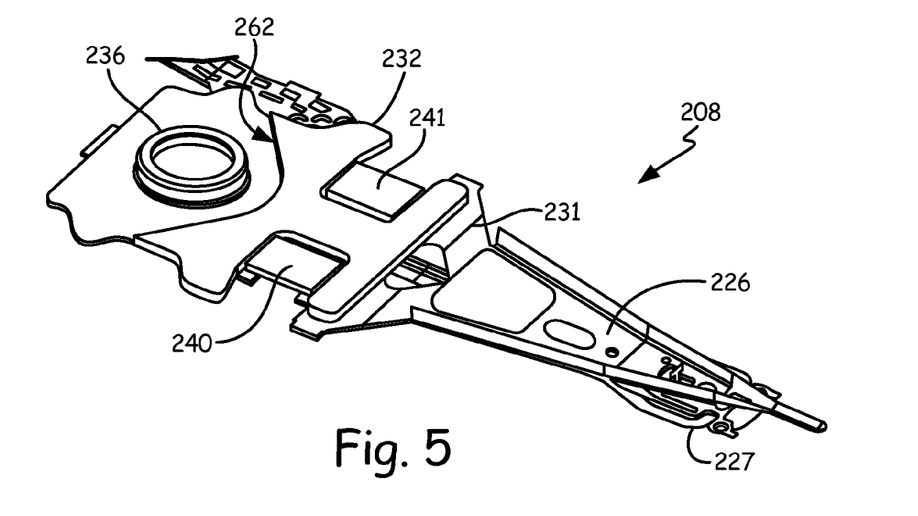
FIG. 5 is a perspective view of a head gimbal assembly according to one embodiment.
Figure 6:
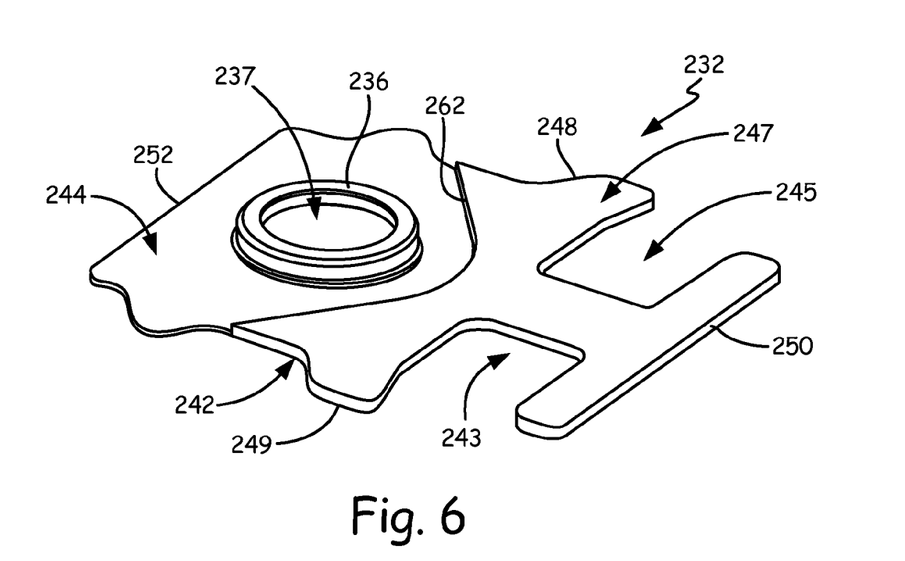
FIG. 6 is an enlarged perspective view of the baseplate of the head gimbal assembly illustrated in FIG. 5.
Figure 7:
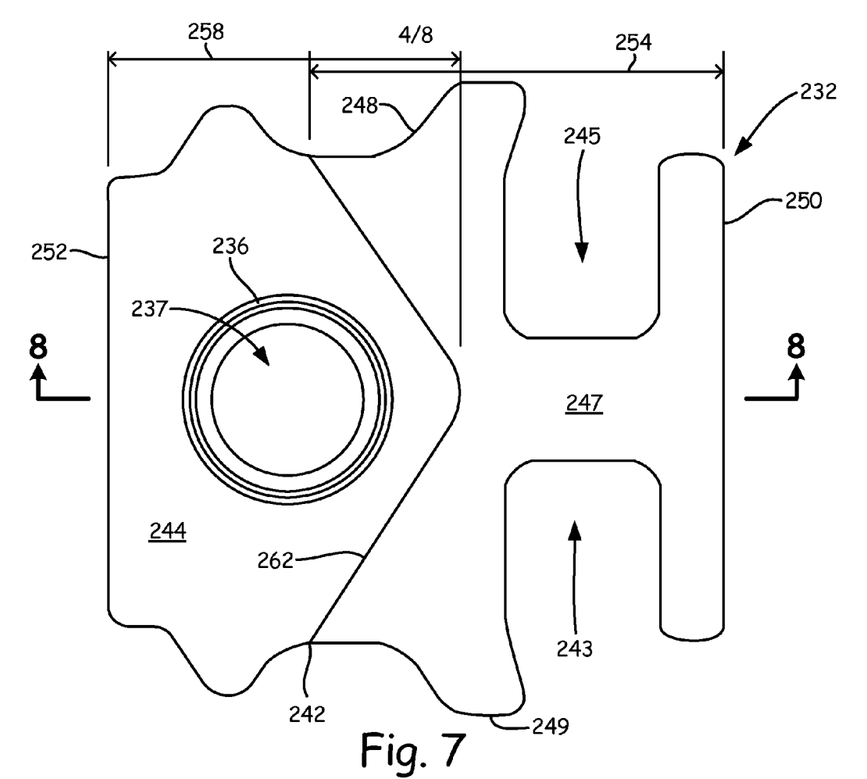
FIG. 7 is an enlarged top view of the baseplate illustrated in FIG. 6.
Figure 8:
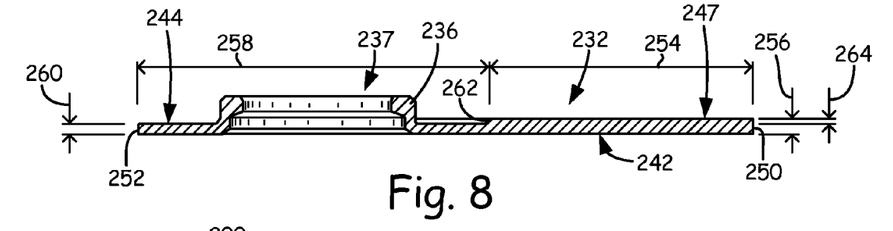
FIG. 8 is an enlarged section view representative of the baseplate illustrated in FIG. 7 and taken along the section line denoted in FIG. 7.

FIG. 5 illustrates an enlarged perspective view of a HGA 208 according to one embodiment. FIG. 6 illustrates an enlarged perspective view of a baseplate 232 of the HGA 208 illustrated in FIG. 5. FIG. 7 illustrates a top view of FIG. 6 and FIG. 8 illustrates a section view taken through the line indicated in FIG. 7. HGA 208 includes a load beam or suspension 226, a gimbal or flexure 227, a hinge 231 and a mount or base plate 232. Load beam 226 supports a header or slider (not shown) carrying transducers via gimbal or flexure 227. As previously described, mount plate or baseplate 232 provides an attachment structure for coupling at least two elements in an electro-mechanical system, such as coupling an actuator arm to HGA 208 in a data storage device. In one embodiment, one side of baseplate 232 is laser welded to load beam 226 and, as illustrated in FIG. 5, a boss tower (i.e., the attachment structure) 236 is located on an opposing side of baseplate 232. Boss tower 236 is configured to insert into an aperture in an actuator arm and undergo a swaging process, such as ball swaging, to couple to the actuator arm. Therefore, baseplate 232 couples the actuator arm to HGA 208. In the embodiment illustrated in FIG. 5, boss tower 236 is integrally formed with or contiguous with a flange 242 and is made of the same material. For example, flange 242 can be made of a ferrite, such as stainless steel, aluminum, engineered plastic and the like.

As with HGA 108, HGA 208 includes a pair of microactuators 240 and 241 that provide HGA 208 with fine positioning of sliders. Microactuators 240 and 241 are piezoelectric actuators and are made of fragile materials. As illustrated in FIGS. 5-7, microactuators 240 and 241 are located within inlets 243 and 245 in baseplate 232. In this way, the rigid material of baseplate 232 provides protection to the fragile material of microactuators 240 and 241.

As illustrated in FIGS. 6-8, mount plate or baseplate 232 includes flange 242 and a boss tower 236 having a through hole 237. Flange 242 has first and second lateral ends 248 and 249, a distal end 250 and a proximal end 252. First and second lateral ends 248 and 249 couple distal end 250 to proximal end 252. Distal end 250 is located closer to gimbal or flexure 227 of load beam 226 than proximal end 252 and proximal end 252 is located closer to a voice coil motor on an actuator mechanism than distal end 250. Boss tower 236 is a projecting or protruding feature formed integrally with or contiguous with flange 242.

In the embodiment illustrated in FIGS. 5-8, baseplate 232 includes two different heights or two different uniform thicknesses. More specifically, flange 242 includes a first portion or distal region 254 (FIG. 8) having a first height or first uniform thickness 256 and a second portion or a proximal region 258 (FIG. 8) having a second height or second uniform thickness 260 that is less than first height or first uniform thickness 256. Proximal region 258 extends from proximal end 252 of flange 242 to a step 262 and distal region 254 extends from distal end 250 of flange 242 to step 262. Step 262 is the boundary between second portion or proximal region 258 and first portion or distal region 254 and includes a height dimension 264 that is substantially equal to the difference between first height or first uniform thickness 256 of distal region 254 and second height or second uniform thickness 260.

As further illustrated in FIGS. 5-8, inlets 243 and 245 that house microactuators 240 and 241 are located in first portion or distal region 254 and boss tower 236 is located in and protrudes from second portion or proximal region 258. In particular, boss tower 236 extends from an area of second portion or proximal region 258 where boss tower 236 meets with a top surface 244 of second portion or proximal region 258. To create the two different heights or two different uniform thicknesses in flange 242, the thickness of second portion or proximal region 258 is reduced by for example a process of coining. Coining is a metal-working process in the form of a precision stamping in which a material is exposed to high compressive forces to induce plastic flow on the surface of the material. Rather than the material being cut, as is common in some stamping processes, coining is done with, for example, mechanical or hydraulically actuated presses that are capable of applying high tonnage.

In particular, flange 242 is manufactured with a thickness equal to the first uniform thickness 256 of first portion or distal region 254. First uniform thickness 256 is made so that a top surface 247 of first portion or distal region 254 is substantially in planar alignment with or extends higher than the tops of microactuators 241 and 243. In this way, first portion or distal region 254 protects the fragile material of microactuators 241 and 243. Then, using for example a coining process, the thickness of second portion or proximal region 258 is reduced to second uniform thickness 260. By reducing the thickness of second portion or proximal region 258, an actuator arm can mate with boss tower 236 in second portion or proximal region 258 and have an overall reduced z-height or HSA-to-disc clearance.

Figure 9:
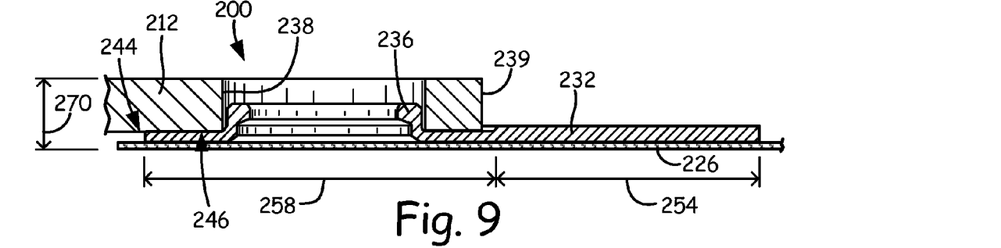
FIG. 9 illustrates an enlarged section view representative of a portion of a head stack assembly incorporating the baseplate illustrated in FIGS. 5-8 and taken along a section line similar to the section line in FIG. 4.

FIG. 9 is an enlarged section view representative of a portion of a HSA 200 according to the embodiment of baseplate 232 illustrated in FIGS. 5-8. More specifically, FIG. 9 illustrates a section view of a portion of an actuator arm 212, baseplate 232 and a portion of a load beam 226 before boss tower 236 is swaged to aperture 238. In FIG. 9, boss tower 236 is inserted into aperture 238 in actuator arm 212 so that top surface 244 of second portion or proximal region 258 is in contact with a portion of a bottom surface 246 of actuator arm 212. With reference back to FIGS. 5-8, second portion or proximal region 258 that is defined by step 262 and has a top surface 244 that is in contact with actuator arm 212 has a shape that corresponds with a tip 239 of actuator arm 212. In particular, the profile of step 262 corresponds with the profile of tip 239. This provides actuator arm 212 with a more repeatable positioning and mating area.

As also illustrated in FIG. 9 and discussed above, the z-height 270 of HSA 200 includes an overall height or thickness of actuator arm 212, baseplate 232 and load beam 226. Compared to z-height 170 in FIG. 4, z-height 27 is reduced without sacrificing the protection of microactuators 240 and 241 located in inlets 243 and 245 while still maintaining structural stiffness and resonance performance in the microactuator region. A reduction in z-height is made possible by reducing the thickness 260 of second portion or proximal region 258 so that it is less than the thickness 256 of first portion or distal region 256.

Figure 10:
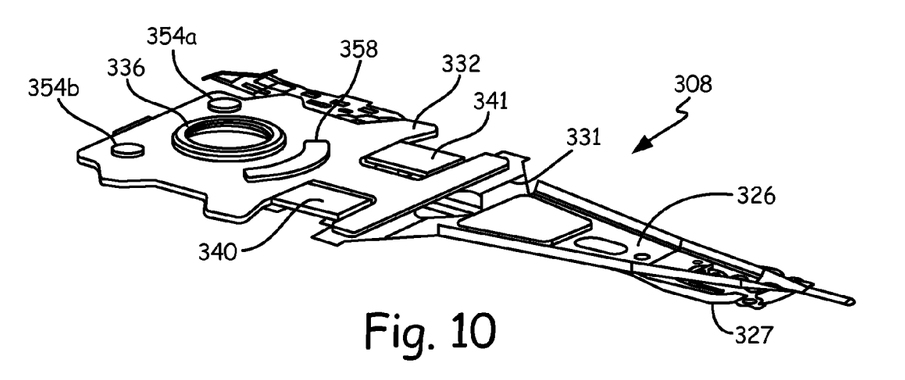
FIG. 10 is a perspective view of a head gimbal assembly according to another embodiment.
Figure 11:
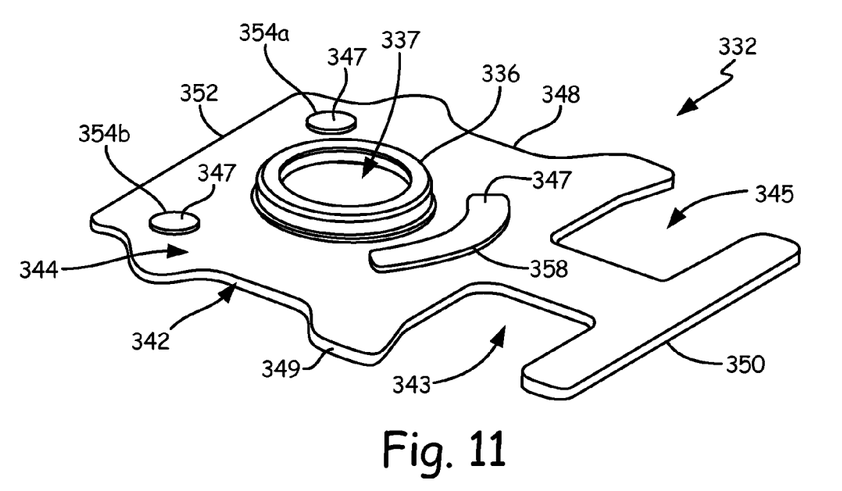
FIG. 11 is a perspective view of the baseplate of the head gimbal assembly illustrated in FIG. 10.
Figure 12:
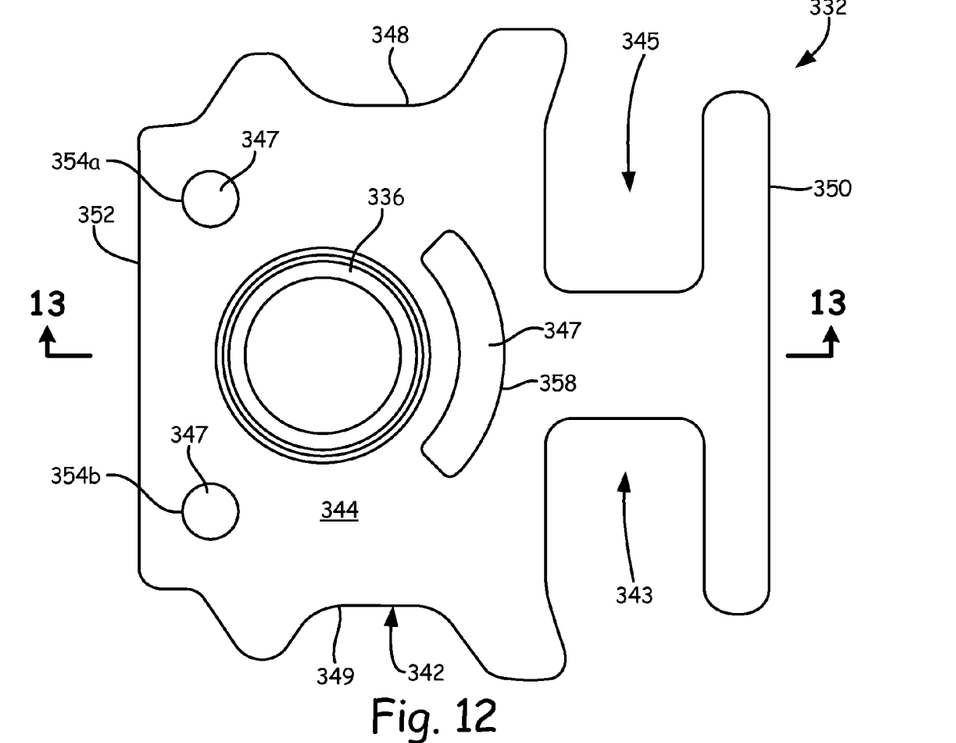
FIG. 12 is an enlarged top view of the baseplate illustrated in FIG. 11.
Figure 13:
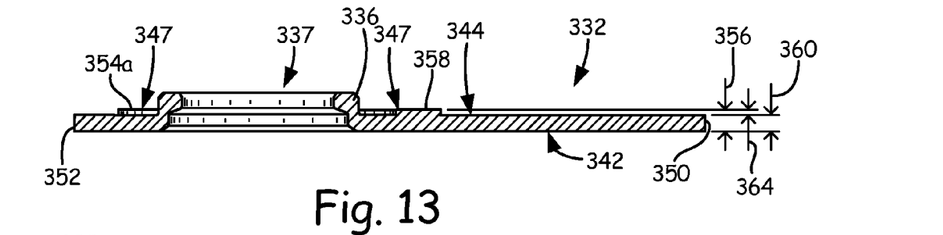
FIG. 13 is an enlarged section view representative of the baseplate illustrated in FIG. 12 and taken along the section line denoted in FIG. 12.

FIG. 10 illustrates an enlarged perspective view of a HGA 308 according to another embodiment. FIG. 11 illustrates an enlarged perspective view of a baseplate 332 of the HGA 308 illustrated in FIG. 10. FIG. 12 illustrates a top view of FIG. 11 and FIG. 13 illustrates a section view taken through the line indicated in FIG. 12. HGA 308 includes a load beam or suspension 326, a gimbal or flexure 327, a hinge 331 and a mount or base plate 332. Load beam 326 supports a header or slider (not shown) carrying transducers via gimbal or flexure 327. As previously described, mount plate or baseplate 332 provides an attachment structure for coupling at least two elements in an electro-mechanical system, such as coupling an actuator arm to HGA 308 in a data storage device. In one embodiment, one side of baseplate 332 is laser welded to load beam 326 and, as illustrated in FIG. 10, a boss tower (i.e., the attachment structure) 336 is located on an opposing side of baseplate 332. Boss tower 336 is configured to insert into an aperture in an actuator arm and undergo a swaging process, such as ball swaging, to couple to the actuator arm. Therefore, baseplate 332 couples the actuator arm to HGA 308. In the embodiment illustrated in FIG. 10, boss tower 336 is integrally formed with or contiguous with a flange 342 and is made of the same material. For example, flange 342 can be made of a ferrite, such as stainless steel, aluminum, engineered plastic and the like.

As with HGA 108 and HGA 208, HGA 308 includes a pair of microactuators 340 and 341 that provide HGA 308 with fine positioning of sliders. In the embodiment illustrated in FIG. 10, microactuators 340 and 341 are piezoelectric actuators and are made of fragile materials. As illustrated in FIGS. 10-12, microactuators 340 and 341 are located within inlets 343 and 345 in baseplate 332. In this way, the rigid material of baseplate 332 provides protection to the fragile material of microactuators 340 and 341.

As illustrated in FIGS. 11-13, mount plate or baseplate 332 includes flange 342 and a boss tower 336 having a through hole 337. Flange 342 has first and second lateral ends 348 and 349, a distal end 350 and a proximal end 352. First and second lateral ends 348 and 349 couple distal end 350 to proximal end 352. Distal end 350 is located closer to gimbal or flexure 327 of load beam 326 than proximal end 352 and proximal end 352 is located closer to a voice coil motor on an actuator mechanism than distal end 350. Boss tower 336 is a projecting or protruding feature formed integrally with or contiguous with flange 342.

In FIGS. 10-13, baseplate 332 includes two different heights or two different uniform thicknesses. More specifically, flange 342 includes a plurality of first portions spaced apart from each other that have a first height or first uniform thickness 356. The remaining portion of flange 342 includes a second height or second uniform thickness 360 that is less than first height or first uniform thickness 356. The portions of flange 342 that have the first height or first uniform thickness are called islands 354a, 354b and 358. In other words, islands 354a, 354b and 358 protrude from the remaining portion of flange 342.

In one embodiment and as illustrated in FIGS. 10-12, islands 354a and 354b are circular in shape. However, islands 354a and 354b can be other types of shapes. Island 354a is longitudinally located between boss tower 336 and proximal end 352 and laterally located between boss tower 336 and first lateral end 348. Island 354b is longitudinally located between boss tower 336 and proximal end 352 and laterally located between boss tower 336 and second lateral end 349. With reference to FIG. 12, the line in FIG. 12 that denotes the section view in FIG. 13 can also be considered as a longitudinal axis of baseplate 332. All features located above the longitudinal axis are mirrored below the longitudinal axis. Therefore, islands 354a and 354b are minors of each other. Island 354a is located in the same position as island 354b, but on an opposite side of the longitudinal axis.

In one embodiment, island 358 is crescent-shaped. However, island 358 can be other types of shapes. Island 358 is longitudinally located between boss tower 336 and distal end 350 and laterally located between first lateral end 348 and second lateral end 349. More specifically, a center of island 358 is located through the longitudinal axis of baseplate 332. Because all features located above the longitudinal axis are mirrored below the longitudinal axis, island 358 has the same mirrored crescent shape below and above the longitudinal axis.

As illustrated in the embodiment in FIGS. 10-13, islands 354a, 354b and 358 are spaced apart from boss tower 336 and include top surfaces 347. Together, top surfaces 347 of islands 354a, 354b and 358 provide a three-point contact plane. The remaining portion of flange 342 having second height or second uniform thickness 360 includes a top surface 344. The three-point contact plane provided by islands 354a, 354b and 358 is located above the remaining portion of flange 342 a height 364 that is substantially equal to the difference between first height or first uniform thickness 356 and second height or second uniform thickness 360.

To create the two different heights or two different uniform thicknesses in flange 342, the thickness of the remaining portion of flange 342 is reduced by for example a process of coining. In particular, flange 342 is manufactured with a thickness equal to the first uniform thickness 356 of the first portions or islands 354a, 354b and 358. First uniform thickness 356 is made so that a top surface 347 of islands 354a, 354b and 358 extends higher than the tops of microactuators 241 and 243. Then, using for example a coining process, the thickness of the remaining portion of flange 342 is reduced to second uniform thickness 360. The top surface 344 of second uniform thickness 360 is in planar alignment with or extends slightly above the tops of microactuators 341 and 343. In this way, the remaining portion of flange 342 still protects the fragile material of microactuators 341 and 343.

Figure 14:
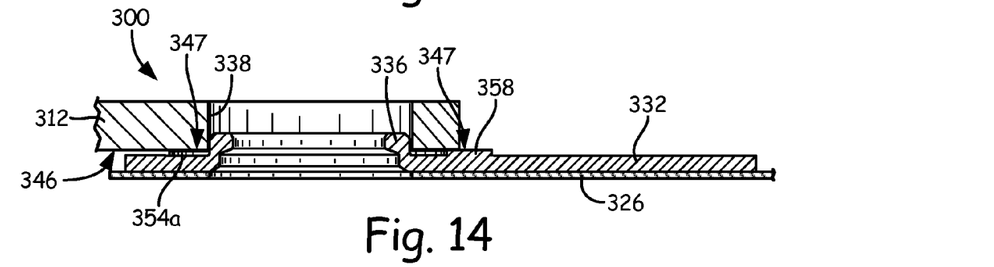
FIG. 14 illustrates an enlarged section view representative of a portion of a head stack assembly incorporating the baseplate illustrated in FIGS. 11-13 and taken along a section line similar to the section line in FIG. 4.

FIG. 14 is an enlarged section view representative of a portion of a HSA 300 according to the embodiment of baseplate 332 illustrated in FIGS. 10-13. More specifically, FIG. 14 illustrates a section view of a portion of an actuator arm 312, baseplate 332 and a portion of a load beam 326 before boss tower 336 is swaged to aperture 338. In FIG. 14, boss tower 336 is inserted into aperture 338 in actuator arm 312 so that top surfaces 347 of islands 354a, 354b and 358 are in contact with a portion of a bottom surface 346 of actuator arm 312. As illustrated in FIG. 14, actuator arm 312 is elevated above top surface 344 of the remainder of baseplate 332 such that actuator arm 312 is less affected by the overall shape of baseplate 332 that was formed in a stamping process. The elevated actuator arm 312 is made possible by reducing the thickness 360 of most of flange 342, but leaving islands 354a, 354b and 358 with the original thickness 356.

Figure 15:
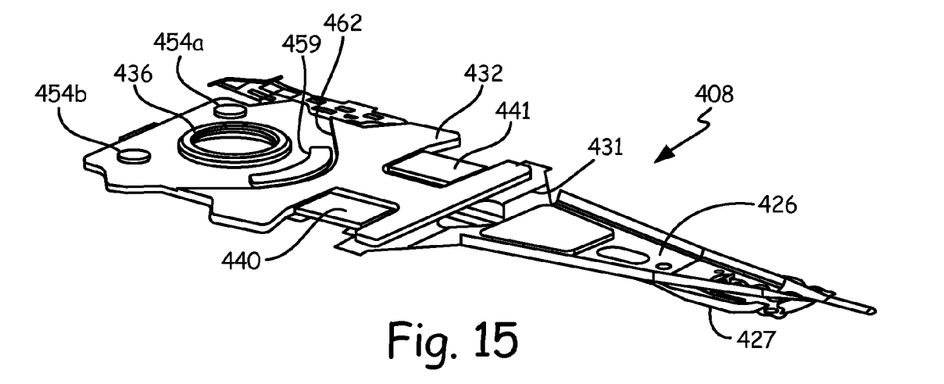
FIG. 15 is an enlarged perspective view of a head gimbal assembly according to yet another embodiment.
Figure 16:
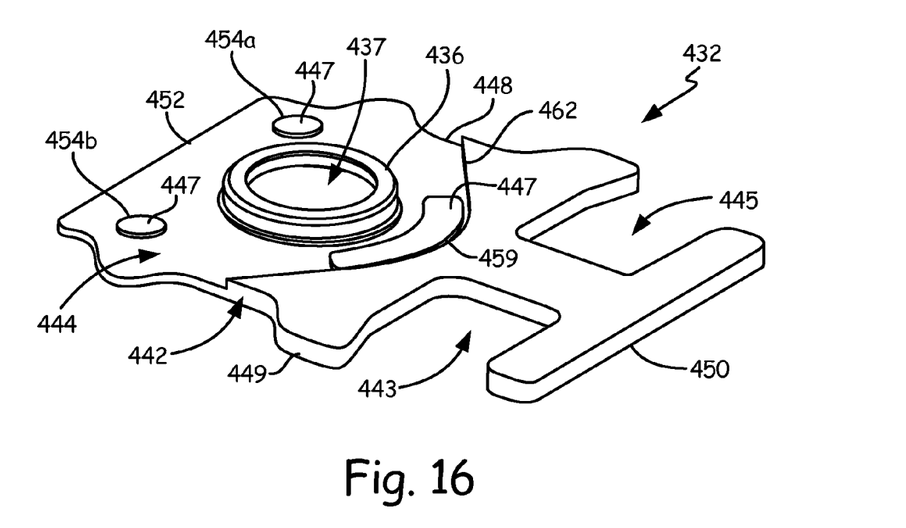
FIG. 16 is an enlarged perspective view of the baseplate of the head gimbal assembly illustrated in FIG. 15.
Figure 17:
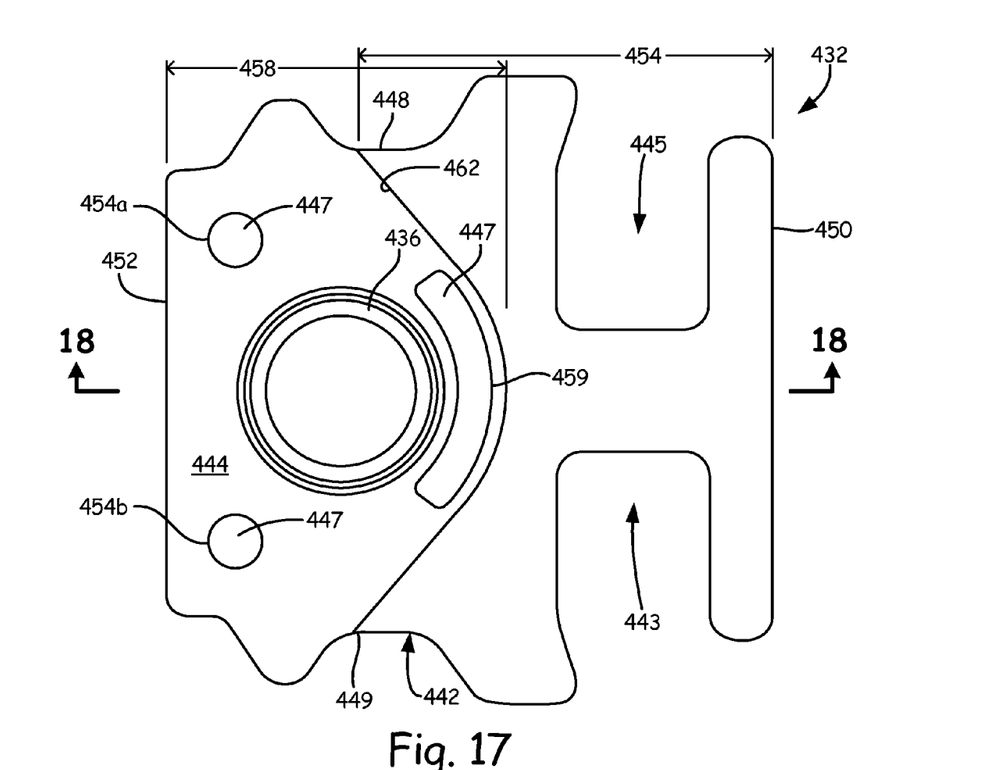
FIG. 17 is an enlarged top view of the baseplate illustrated in FIG. 16.
Figure 18:
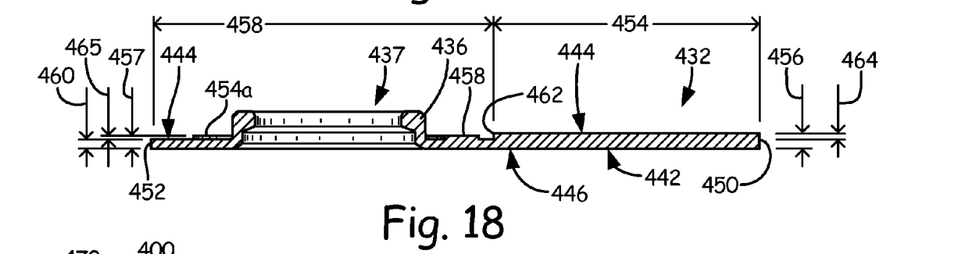
FIG. 18 is an enlarged section view representative of the baseplate illustrated in FIG. 17 and taken along the section line denoted in FIG. 17.

FIG. 15 illustrates an enlarged perspective view of a HGA 408 according to yet another embodiment. FIG. 16 illustrates an enlarged perspective view of a baseplate 432 of the HGA 408 illustrated in FIG. 15. FIG. 17 illustrates a top view of FIG. 16 and FIG. 18 illustrates a section view taken through the line indicated in FIG. 17. HGA 408 includes a load beam or suspension 426, a gimbal or flexure 427, a hinge 431 and a mount or base plate 432. Load beam 426 supports a header or slider (not shown) carrying transducers via gimbal or flexure 427. As previously described, mount plate or baseplate 432 provides an attachment structure for coupling at least two elements in an electro-mechanical system, such as coupling an actuator arm to HGA 408 in a data storage device. In one embodiment, one side of baseplate 432 is laser welded to load beam 426 and, as illustrated in FIG. 15, a boss tower (i.e., the attachment structure) 436 is located on an opposing side of baseplate 432. Boss tower 436 is configured to insert into an aperture in an actuator arm and undergo a swaging process, such as ball swaging, to couple to the actuator arm. Therefore, baseplate 432 couples the actuator arm to HGA 408. In the embodiment illustrated in FIG. 15, boss tower 436 is integrally formed with or contiguous with a flange 442 and is made of the same material. For example, flange 442 can be made of a ferrite, such as stainless steel, aluminum, engineered plastic and the like.

As with HGAs 108, 208 and 308, HGA 408 includes a pair of microactuators 440 and 441 that provide HGA 408 with fine positioning of sliders. Microactuators 440 and 441 are piezoelectric actuators and are made of fragile materials. As illustrated in FIG. 15, microactuators 440 and 441 are located within inlets 443 and 445 in baseplate 432. In this way, the rigid material of baseplate 432 provides protection to the fragile material of microactuators 440 and 441.

As illustrated in FIGS. 16-18, mount plate or baseplate 432 includes flange 442 and a boss tower 436 having a through hole 437. Flange 442 has first and second lateral ends 448 and 449, a distal end 450 and a proximal end 452. First and second lateral ends 448 and 449 couple distal end 450 to proximal end 452. Distal end 450 is located closer to gimbal or flexure 427 of load beam 426 than proximal end 452 and proximal end 452 is located closer to a voice coil motor on an actuator mechanism than distal end 450. Boss tower 436 is a projecting or protruding feature formed integrally with or contiguous with flange 442.

In the embodiment illustrated in FIGS. 15-18, baseplate 432 includes three different heights or three different uniform thicknesses. More specifically, flange 442 includes a first portion or distal region 454 (FIG. 18) having a first height or first uniform thickness 456, a second portion or a proximal region 458 (FIG. 18) having a second height or second uniform thickness 460 that is less than first height or first uniform thickness 456 and a plurality of third portions spaced apart from each other that have a third height or third uniform thickness 457.

Proximal region 458 extends from proximal end 452 of flange 442 to a step 462 and distal region 454 extends from distal end 450 of flange 442 to step 462. Step 462 is the boundary between second portion or proximal region 458 and first portion or distal region 454 and includes a height dimension 464 that is substantially equal to the difference between first height or first uniform thickness 456 of distal region 454 and second height or second uniform thickness 460. The portions of flange 442 that have the third height or third uniform thickness are called islands 454a, 454b and 459. In other words, islands 454a, 454b and 459 protrude from second portion or proximal region 458 of flange 442, which includes a top surface 444.

As further illustrated in FIGS. 15-18, inlets 443 and 445 that house microactuators 440 and 441 are located in first portion or distal region 454 and boss tower 436 is located in and protrudes from second portion or proximal region 458. In particular, boss tower 436 extends from an area of second portion or proximal region 458 where boss tower 436 meets with a top surface 444 of second portion or proximal region 458.

In one embodiment and as illustrated in FIGS. 15-17, islands 454a and 454b are similar in shape and position to islands 354a and 354b. Island 459 is similar in shape and position to island 358. However, besides island 459 being longitudinally located between boss tower 436 and distal end 450 and laterally located between first lateral end 448 and second lateral end 449, island 459 is also longitudinally located between boss tower 436 and step 462.

As illustrated in the embodiment in FIGS. 15-18, islands 454a, 454b and 459 are spaced apart from boss tower 436 and include top surfaces 447. Together, top surfaces 447 of islands 454a, 454b and 459 provide a three-point contact plane. The three-point contact plane provided by islands 454a, 454b and 459 is located above proximal region 458 of flange 442 a height 465 that is substantially equal to the difference between third height or third uniform thickness 457 and second height or second uniform thickness 460.

To create the three different heights or three different uniform thicknesses in flange 442, the thickness of second portion or proximal region 458 and the thickness of the third portions are reduced by, for example, a process of coining. In particular, the second portion or proximal region 458 including the area occupied by islands 454a, 454b and 459 of flange 442 is first reduced by a height substantially equal to the difference between first height 456 and third height 457. Then, the second portion or proximal region 458 (not including the area occupied by islands 454a, 454b and 459) are further reduced by a height substantially equal to the different between third height 457 and second height 460. Therefore, third uniform thickness having third height 457 is less than first uniform thickness or first height 456 and greater than second uniform thickness or second height 460.

Figure 19:
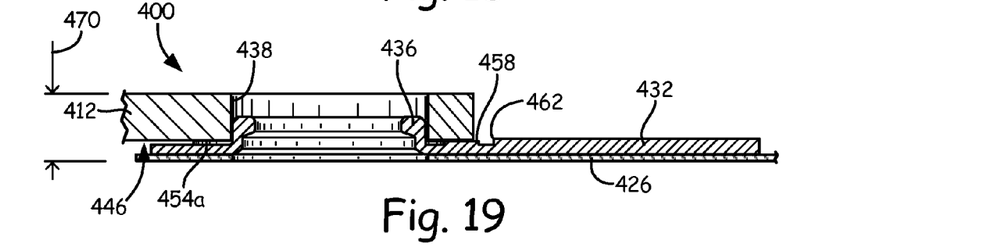
FIG. 19 illustrates an enlarged section view representative of a portion of a head stack assembly incorporating the baseplate illustrated in FIGS. 16-18 and taken along a section line similar to the section line in FIG. 4.

FIG. 19 is an enlarged section view representative of a portion of a HSA 400 according to the embodiment of baseplate 432 illustrated in FIGS. 15-18. More specifically, FIG. 19 illustrates a section view of a portion of an actuator arm 412, baseplate 432 and a portion of a load beam 426 before boss tower 436 is swaged to aperture 438. In FIG. 19, boss tower 436 is inserted into aperture 438 in actuator arm 412 so that top surfaces 447 of islands 454a, 454b and 458 are in contact with a portion of a bottom surface 446 of actuator arm 412. As illustrated in FIG. 19, actuator arm 412 is elevated above top surface 444 of proximal region 458 such that actuator arm 412 is less affected by the overall shape of baseplate 432 that was made in a stamping process. At the same time, compared to z-height 170 in FIG. 4, z-height 470 is reduced without sacrificing the protection of microactuators 440 and 441 located in inlets 443 and 445 while still providing for boss tower 436 to be swaged coupled to actuator arm 412. A reduction in z-height is made possible by reducing the thickness 460 of second portion or proximal region 258 relative to first thickness 456 as well as reducing the thickness 457 of islands 454a, 454b and 459 relative to first thickness 456.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A component for attaching at least two elements, the component comprising:
   a flange comprising:
      a distal end, an opposing proximal end, a first lateral end connecting the distal end to the proximal end and an opposing second lateral end connecting the distal end to the proximal end;
      a distal region defined by the distal end, a portion of the first lateral end, a portion of the second lateral end and a step;
      a proximal region defined by the proximal end, a remaining portion of the first lateral end, a remaining portion of the second lateral end and the step;
      wherein the step extends from the first lateral end to the second lateral end of the flange;
      wherein the distal region has a first uniform thickness and the proximal region has a second uniform thickness, the second uniform thickness being less than the first uniform thickness; and
   a boss tower that protrudes from the proximal region and is contiguous with the flange, wherein the boss tower protrudes from the proximal region of the flange.

2. The component of claim 1, wherein the step comprises a height, the height being the difference between the first uniform thickness and the second uniform thickness.

3. The component of claim 1, wherein the boss tower protrudes from a top surface of the proximal region and mates with an aperture in a first element, the top surface of the proximal region being in contact with a bottom surface of the first element.

4. The component of claim 1, wherein the proximal region of the flange that includes the first uniform thickness comprises a plurality of islands that are spaced apart from the boss tower and are spaced apart from the proximal end of the flange.

5. The component of claim 4, wherein each of the plurality of islands comprises a top surface, the top surface of each of the plurality of islands is in contact with a bottom surface of a first element, the first element including an aperture to which the boss tower is engaged.

6. The component of claim 4, wherein each of the plurality of islands has a third uniform thickness that is less than the first uniform thickness and greater than the second uniform thickness.

7. The component of claim 6, wherein each of the plurality of islands protrude from a top surface of proximal region of the flange.

8. The component of claim 7, wherein each of the plurality of islands comprises a top surface, the top surface of each of the plurality of islands is in contact with a bottom surface of a first element, the first element including an aperture to which the boss tower is engaged.

9. A baseplate for coupling a suspension assembly to an actuator in a data storage device, the baseplate comprising:
   a flange having a proximal region that extends from a proximal end of the flange to a step and a distal region that extends from a distal end of the flange to the step, the step extending from a first lateral end that connects the distal end to the proximal end to an opposing second lateral end that connects the distal end to the proximal end; and
   a boss tower that is located in the proximal region of the flange and is contiguous with the flange, the boss tower protruding from the proximal region of the flange; and
   wherein the distal region of the flange includes at least a first uniform thickness and a second uniform thickness, the first uniform thickness being greater than a second uniform thickness.

10. The baseplate of claim 9, wherein the step comprises a height, the height being the difference between the first uniform thickness and the second uniform thickness.

11. The baseplate of claim 9, wherein the boss tower protrudes from a top surface of the proximal region and mates with an aperture in the actuator.

12. The baseplate of claim 11, wherein the top surface of the proximal region is in contact with a bottom surface of the actuator.

13. The baseplate of claim 11, further comprising a plurality of islands spaced apart from each other, from the boss tower and from the proximal end and protruding from the top surface of the proximal region.

14. The baseplate of claim 13, wherein the plurality of islands comprise a third uniform thickness and top surfaces, the third uniform thickness being less than the first uniform thickness and greater than the second uniform thickness and the top surfaces of the plurality of islands are in contact with the bottom surface of the actuator.

15. A component for attaching at least two elements, the component comprising:
a flange comprising:
a first portion with a first uniform thickness;
a second portion with a second uniform thickness, the second uniform thickness being less than the first uniform thickness;
at least one island protruding from a top surface of the second portion and having a third uniform thickness that is less than the first uniform thickness and greater than the second uniform thickness; and
a boss tower that protrudes from and is contiguous with the flange, wherein the boss tower protrudes from the top surface of the second portion of the flange;
wherein each island is spaced apart from the boss tower and includes a top surface that is in contact with a bottom surface of an actuator arm, the actuator arm including an aperture to which the boss tower is engaged.

16. The component of claim 15, wherein the first portion of the flange that includes the first uniform thickness comprises a distal region that extends from a distal end of the flange to a step and the second portion of the flange that includes the second uniform thickness comprises a proximal region that extends from a proximal end of the flange to the step.

17. The component of claim 16, wherein the flange further comprises a first lateral end that connects the distal end to the proximal end and defines a side of the flange and a second lateral end that connects the distal end to the proximal end and defines an opposing side of the flange.

18. The component of claim 17, wherein the step extends from the first lateral edge to the second lateral edge of the flange.

19. The component of claim 16, wherein each island is further spaced apart from the proximal end of the flange and the step.

* * * * *